United States Patent
Eschbach et al.

(10) Patent No.: US 9,137,405 B2
(45) Date of Patent: Sep. 15, 2015

(54) SYSTEM FOR CREATING CERTIFIED DOCUMENT COPIES

(71) Applicant: Xerox Corporation, Norwalk, CT (US)

(72) Inventors: Reiner Eschbach, Webster, NY (US); Edward Chapman, Rochester, NY (US); Elizabeth D. Wayman, Ontario, NY (US); Michael Branciforte, Rochester, NY (US); Zhigang Fan, Webster, NY (US); Saurabh Prabhat, Webster, NY (US); Holly Elizabeth Turner, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 111 days.

(21) Appl. No.: 13/961,181

(22) Filed: Aug. 7, 2013

(65) Prior Publication Data

US 2015/0043039 A1   Feb. 12, 2015

(51) Int. Cl.
*H04N 1/40* (2006.01)
*H04N 1/00* (2006.01)
*G06K 15/02* (2006.01)
*G06K 15/00* (2006.01)
*H04N 1/32* (2006.01)
*H04N 1/44* (2006.01)

(52) U.S. Cl.
CPC ........ *H04N 1/00867* (2013.01); *G06K 15/1809* (2013.01); *G06K 15/1885* (2013.01); *G06K 15/1889* (2013.01); *G06K 15/4095* (2013.01); *H04N 1/32267* (2013.01); *H04N 1/4446* (2013.01)

(58) Field of Classification Search
None
See application file for complete search history.

(56) References Cited

U.S. PATENT DOCUMENTS

| 7,740,281 B2 * | 6/2010 | Gaffney et al. ........ 283/72 |
| 2006/0066907 A1 * | 3/2006 | Nakata et al. ....... 358/3.1 |
| 2006/0089915 A1 * | 4/2006 | Kantholy et al. ....... 705/57 |
| 2006/0282661 A1 * | 12/2006 | True et al. ............ 713/156 |
| 2008/0179876 A1 * | 7/2008 | Gaffney et al. ........ 283/72 |
| 2009/0279143 A1 * | 11/2009 | St. Jacques et al. ...... 358/3.28 |
| 2010/0128320 A1 | 5/2010 | Fan et al. |

* cited by examiner

Primary Examiner — Dung Tran
(74) Attorney, Agent, or Firm — Fox Rothschild LLP

(57) ABSTRACT

To print a certified document, a user may select or a system may receive a selection of a document to be certified. The system identifies a security template to be used based on the document and/or capabilities of the print device on which the document will be printed. The system may display the document with a non-secure overlay of the selected security template, add a unique security element to the document according to the template, and cause the document to be printed at the selected print device with the added security element without permitting the added security element to be fully displayed or printed on any other device.

29 Claims, 7 Drawing Sheets

200

Secure Document Printing   Alpha_0.0     English ▼

| 1. Enter Name | 2. Select Document | 3. Select Printer | 4. Select Security Option | 5. Confirm Printing |

203 — Select a document category.
Birth Certificates ▼   Select Category

Show Admin Options

205 — Select a document from Birth Certificates.
Dubie, Eli ▼   Select Document

FIG. 2

SYSTEM FOR CREATING CERTIFIED DOCUMENT COPIES

BACKGROUND

The process of creating a certified copy of a document requires several time- and resource-consuming steps, such as manually affixing a seal to the document. In many cases, these steps may certify the physical document—i.e., the substrate on which the information is printed—but not necessarily the information itself. For example, a seal affixed to a document may authenticate the physical paper, but it does not protect someone from altering the information printed on the paper. For documents such as birth certificates, regulatory permits, and other legal document, protecting the information is often more important than protecting the physical document itself.

This document describes improved methods and systems for generating certified copies of documents.

SUMMARY

In one embodiment, a certified document generation system may include one or more processors, a display device, and a non-transitory, computer-readable memory containing programming instructions. When executed by one or more of the processors, the instructions may cause one or more of the processors to receive a selection of a document to be certified, identify an available print device on which the document will be printed, identify a set of available security templates that correspond to capabilities of the print device, select one of the available security templates, cause the display device to display the document with a non-secure overlay of the selected security template, add a unique security element to the document according to the template without completely displaying the added security element on the display device, and cause the document to be printed at the selected print device with the selected security template and the added security element.

Optionally, such a system also may include programming instructions that cause the system receive identification information about the user, and causing the document to be printed may include causing the added security element to include the identifying information about a user who selected the document as secure text. As another option, the system may include programming instructions that cause the system to extract information from the document, and causing the document to be printed may include causing the added security element to include the extracted information as secure text. As another option, adding the unique security element to the document may include adding the unique security element to the document without sending the full unique security element to any device that may output the document other than the selected print device.

Optionally, after selecting the security template, the system may identify an alternative selection that, if implemented, would yield a printed document with a higher level of security. The alternative selection may include a different available printer, a different security template, or both. If so, the system may offer the alternative selection to a user. If the user accepts the alternative selection, then before causing the document to be printed, the system may change the selected print device, the selected security template, or both to match the alternative selection.

Optionally, when identifying the set of available security templates that correspond to capabilities of the print device, the system may, for each of a plurality of candidate security templates; determine whether the candidate security template includes a consumable item criterion; determine whether the print device can meet the applicable criterion; and exclude the candidate security template from the set if the device does not meet the criterion.

Any or all of the steps described above may be implemented by various systems, such as on a print device; by a computer that is connected to a print device; on a networked system, embodied in software code, or in other mechanisms.

BRIEF DESCRIPTION OF THE DRAWINGS

FIG. 2 illustrates an example of a document selection interface.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

In this document, the terms "computing device" and "processor" refer to a computer or other machine that performs one or more operations according to one or more programming instructions. Examples of computing devices include desktop computers, laptop computer, electronic tablets, ultrabooks, smart phones, smart televisions, and similar electronic devices having processing and user interface capability. Various elements of an example of a computing device or processor are described below in reference to FIG. 7.

In this document, the term "document processing system" refers to a system that includes one or more processors that are in electronic communication with a non-transitory, computer-readable memory containing programming instructions that, when executed, cause one or more of the processors to implement commands to perform document processing functions such as those described above and below.

In this document, the terms "communication" and "electronic communication" refer to the ability to transmit data via one or more signals between two or more electronic devices, whether through a wired or wireless network, and whether directly or indirectly via one or more intermediary devices.

In this document, the term "print device" refers to a device that performs printing based on digital data, or a multi-functional device in which one of the functions is printing based on digital data. Examples include printers, copiers, plotters, and multi-function devices.

Figure 1:
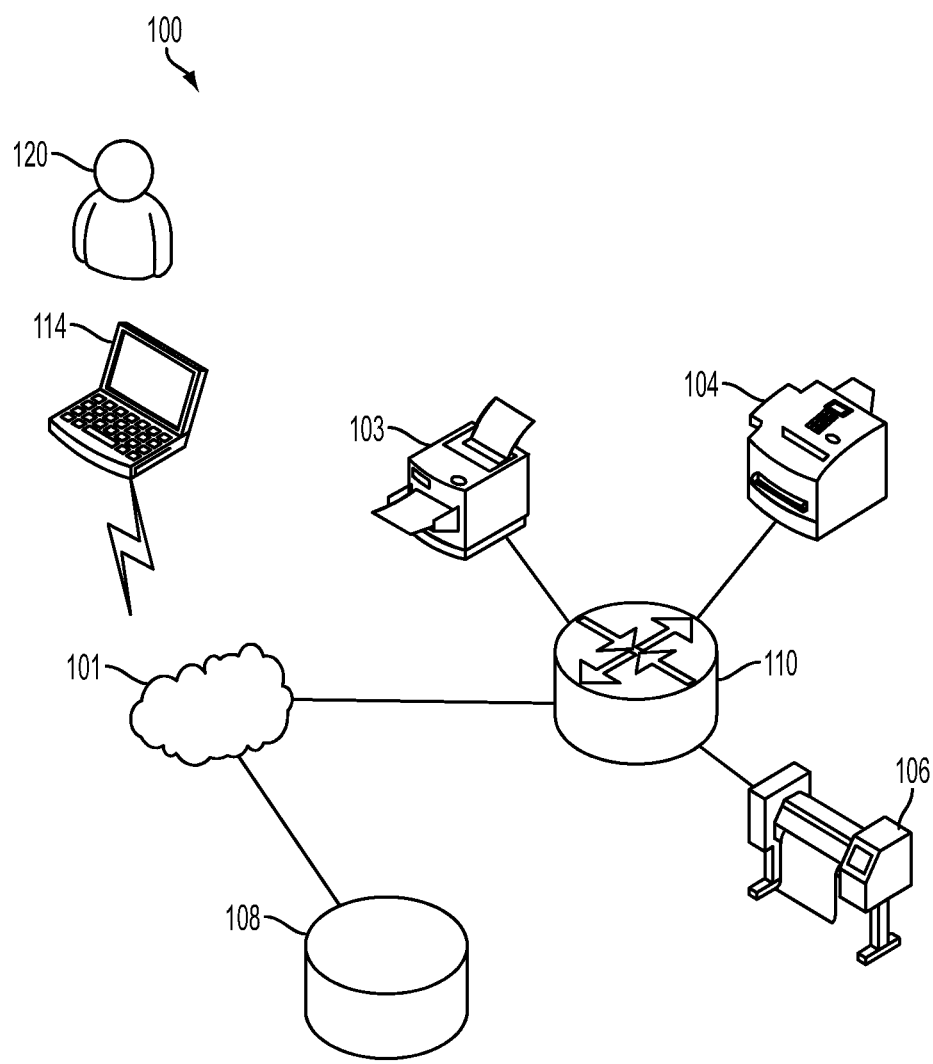
FIG. 1 illustrates various elements that may be included with and/or used by a certified document generation system

FIG. 1 illustrates an example of various hardware elements that may be used to implement a certified document generation system 100. System 100 includes or is connected to one or more networks 101. As used in this document, the term "connected" refers to any configuration in which two or more devices may share data, programming instructions or other electronic communications with each other via wired and/or wireless communications. A user 120 accesses the system by one or more computing devices 114, which may execute programming instructions to implement the processes described below, or which may contain and execute software (such as a browser or other portal software) that allows a user to access the system as executed by an external computing device.

Any number of print devices 103, 104, 106 are connected to network 101. A networking device 110 such as a router may serve as a device to route information received via the network 101 to an appropriate print device. Networking device 110 may be any device capable of forwarding, routing, or otherwise transmitting packets and/or messages through a network, and any number of networking devices may be positioned within or on either side of network 101.

The system also may include one or more data storage facilities 108, such as a database that resides in a computer-readable memory and serves as a document repository, that includes various data files corresponding to documents and/or document templates that are available to be printed by a print device. In the discussion below, the acts of selecting a document and printing a document may include actions taken on a document based on the document's data as it exists in the data storage facility, as well as actions taken on a document generated by the addition of data to a document template by a user. The data storage facilities 108 may also include a set of security templates, which are instructions that, when implemented by a certified document generation system, cause a document to be printed with one or more security elements. The data storage facilities 108 may include memory portions that are physically separate from the user's computing device 114 as shown, and/or they may include memory portions that are part of the user's computing device 114.

The systems described in this document may include implementations that are embodied in a print device, a computing device with a connected print device, a software program a cloud based system, or any combination of these items.

There are many situations in which a user may require a certified copy of a document. A certified copy is a printed document that contains one or more security elements that serve as an indicator that the document was generated by an authorized entity. The authorized entity may be a federal, state or local government agency, or an entity to whom authorization is delegated, such as an automobile association or notary public. The security element is an item printed on or otherwise applied to the substrate that uniquely enables a reader of the document to identify the document as originating from an authorized source. Examples of security elements include raised seals, watermarks, and data encoded as microtext. In general, the security elements have features that cannot be photocopied or scanned by ordinary copying devices without altering the appearance of the security element. For example, data encoded as microtext may be so small that it is not within the resolution of ordinary copying devices, or if it is within the resolution of an ordinary copy device it may be so faint that it could not be copied without also substantially altering the appearance of the background or other information printed on the document.

The system described below enables certified documents to be created by individuals who are not necessarily trained in the process of applying raised seals or other security elements. In this system a user actively generates the document, but the security elements are not alterable by the user, and generally not even displayed to the user. Rather, the security elements only appear on the final document printed by the print device. In this way, a user cannot circumvent the uniqueness of a security element by creating additional copies through a "print screen" or other screen capture command.

Referring to FIG. 2, the system may include a document selection interface 200 such as a screen that displays the results of user/system interaction with a document repository. The system may enable a user to select a document from the document repository by any suitable means, such as a search interface or a document selection interface 205 that displays the documents in a drop-down list as shown or another format. The document selection interface also may include one or more category selectors 203 that enable a user to identify specific criteria for the desired document, such as a category or type of document. When the user selects one or more criteria, the system may search the document repository for available documents that satisfy the criteria and cause the document selection interface 205 to display only documents that satisfy the criteria.

As noted above, the document repository may contain completed documents, or it may include document templates into which a user may input information. If the user is accessing a template, then after or concurrently with presenting the document selection interface, the system may receive data from the user, and it may populate the template with the data to generate a new document that includes the received data as applied to the template. The documents and templates contained in said repository may be devoid of at least some of the security elements or technologies that will be generated later in the process.

Figure 3:
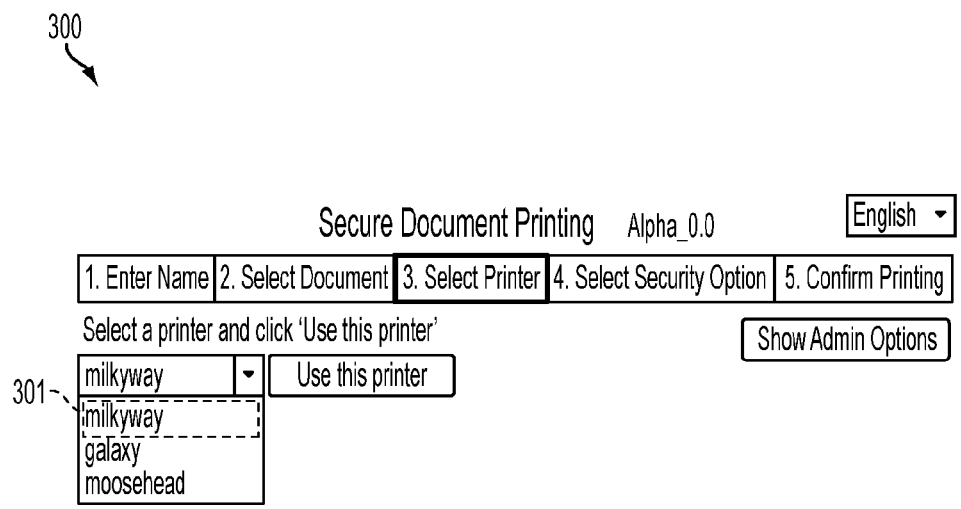
FIG. 3 illustrates an example of a printer selection interface.

After the system identifies a selected document for printing, it may select a printer on which the document will be printed. FIG. 3 illustrates an example of a printer selection interface 300 in which the system presents a user with a set of available printers 301, and the user selects a printer on which the document will be printed. The system may determine the available printers that will be presented using any suitable rule set, such as rules that determine whether the printer is available to the user via the network, whether the computing device has installed the appropriate print driver for that printer, or whether the printer has the required capabilities (such as size capabilities, color capabilities, speed capabilities, sufficient or specifically-required paper or other substrate, or resolution capabilities as required for security elements. Alternatively, the system may automatically select a print device using any suitable rules or other criteria, such as a requirement to use default printer that is assigned to the user or the computing device, in which case the printer selection interface 300 may not be required.

Figure 4:
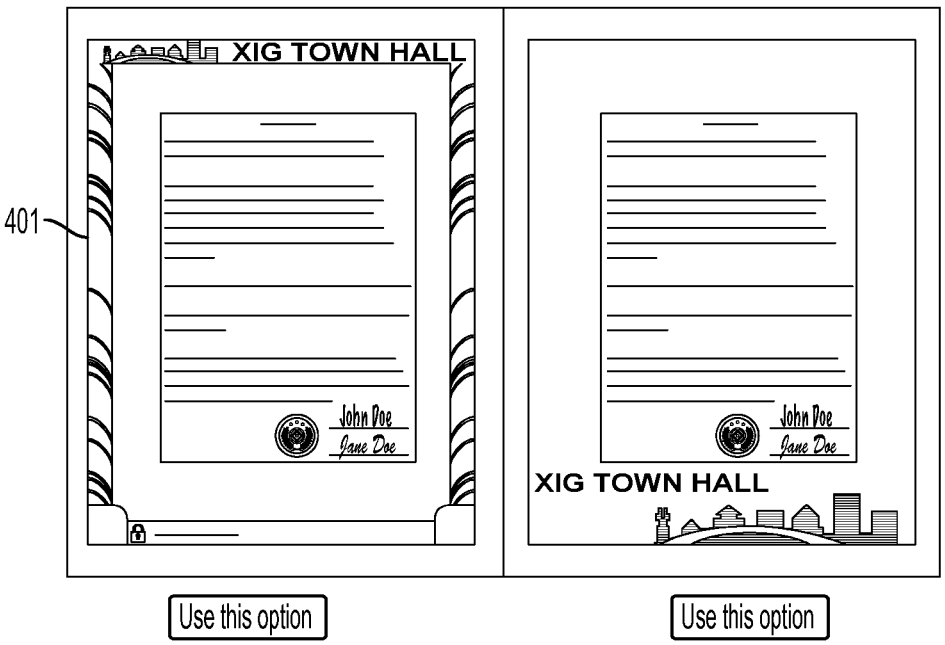
FIG. 4 illustrates an example of a security template selection interface.

Before, while or after the system identifies a print device that will be used to print the document on a substrate, it may identify a security template that will be applied to the certified, printed document, or may select the appropriate security technology for the template and device combination. FIG. 4 illustrates that the system may output the results of this process and receive user selections via a security template selection interface 400. To do this, the system may access a data set of printer capabilities to identify one or more capabilities of the selected print device; access a data set of available security templates, each of which includes one or more print device requirements; and return any number of security templates whose requirements are satisfied by the selected print device. Security template requirements may include, for example: (i) that the printer be stocked with a certain type of sufficient quantity of a consumable item, such as a suitable number of pages or volume of ink or toner to print the entire document; (ii) that the printer have a print resolution sufficiently high to enable security elements; (iii) that the printer has the sufficient color capabilities to enable the security elements; and/or (iv) that the printer has the appropriate software to allow the creation of the security elements. Example security elements and technologies are described in U.S. Pat. Nos. 7,580,153; 7,787,154; 7,800,785; 7,852,515; 8,056,821; 8,211,490; and 8,482,807, the disclosures of which are fully incorporated herein by reference. Optionally, the security templates also may include metadata identifying the types of document with which the templates may be used, and when accessing the data set it may also require that the returned security templates only include those that may be used with the selected document. Optionally, some or all of the security templates may be mandated by a certifying organization, in which case the user may be limited selecting a template from a set of pre-approved templates, or the user may not be given any option to select or reject a template but instead may be required to accept the mandated template.

If security templates are available whose requirements match the selected document and selected printer capabilities, the system may present the available security templates to the user for user selection via a selection interface 401. If only one security template satisfies the criteria, then the system may automatically select that security template and the security template selection interface 400 may not be required. Similarly, the system may be programmed to automatically select the security template based on any criteria, such as selecting, from the templates that satisfy the document and printer criteria, the template that yields the highest level of security. Security levels may be included in the template data set, such as in metadata for each template file. If no security templates are available for the printer, or if the system is programmed to allow the user to assess what security templates are available for other printers, then the system may present the user with a printer selector 403 that enables the user to implement a command to change the printer selection. In addition, if the system determines that security templates with higher security levels are available for other printers, but not for the selected printer, then the system may inform the user that higher-security options are available, and it may present the user with the printer selector 403 so that the user can go back and select the printer with the highest available security option.

Although FIGS. 2-4 illustrate the various user interfaces as being implemented on an electronic display device, it is contemplated that any or all of the user interfaces may be implemented in whole or in part by audio commands, such as by outputting an audible description of available documents, printers and/or security templates, and/or receiving voice commands and using any now or hereafter known process of recognizing and implemented the commands that are received.

Note that in FIG. 4, the security templates are shown in the user's display, but no security data, or at least only an incomplete subset of the security data, is actually exchanged with the user's computing device. Rather, only a non-secure overlay corresponding to the security template is shown. In this way, the user cannot generate additional copies of the final, certified document by implementing a print screen command, a screen capture command, or any command other than a command to print the certified document at the selected printer.

Optionally, before printing the document with the security elements in accordance with the security template, the system may execute one or more rules to generate the unique security elements to embed into the template. For example, the rules may include retrieving identifying information about the source of the document (such as a user name or other identifier, an office identifier, or a requesting entity identifier), the time and/or date of printing, a unique serial code, icon, image or seal, and causing the identifying information to be printed as part of the security element in accordance with rules of the security template. In some embodiments, the security template rules may cause the system to extract actual data from the document, such as data from one or more document fields or associated metadata, and print the extracted data in the security element in accordance with the rules of the security template. Extracting data may be done by any suitable method, such as character recognition, by extracting data from the document file, or—if the user is generating the document from a template with new data—by using some or all of the received data as the extracted data. It is understood that the user might also add supplemental data that will be treated similarly.

Figure 5:
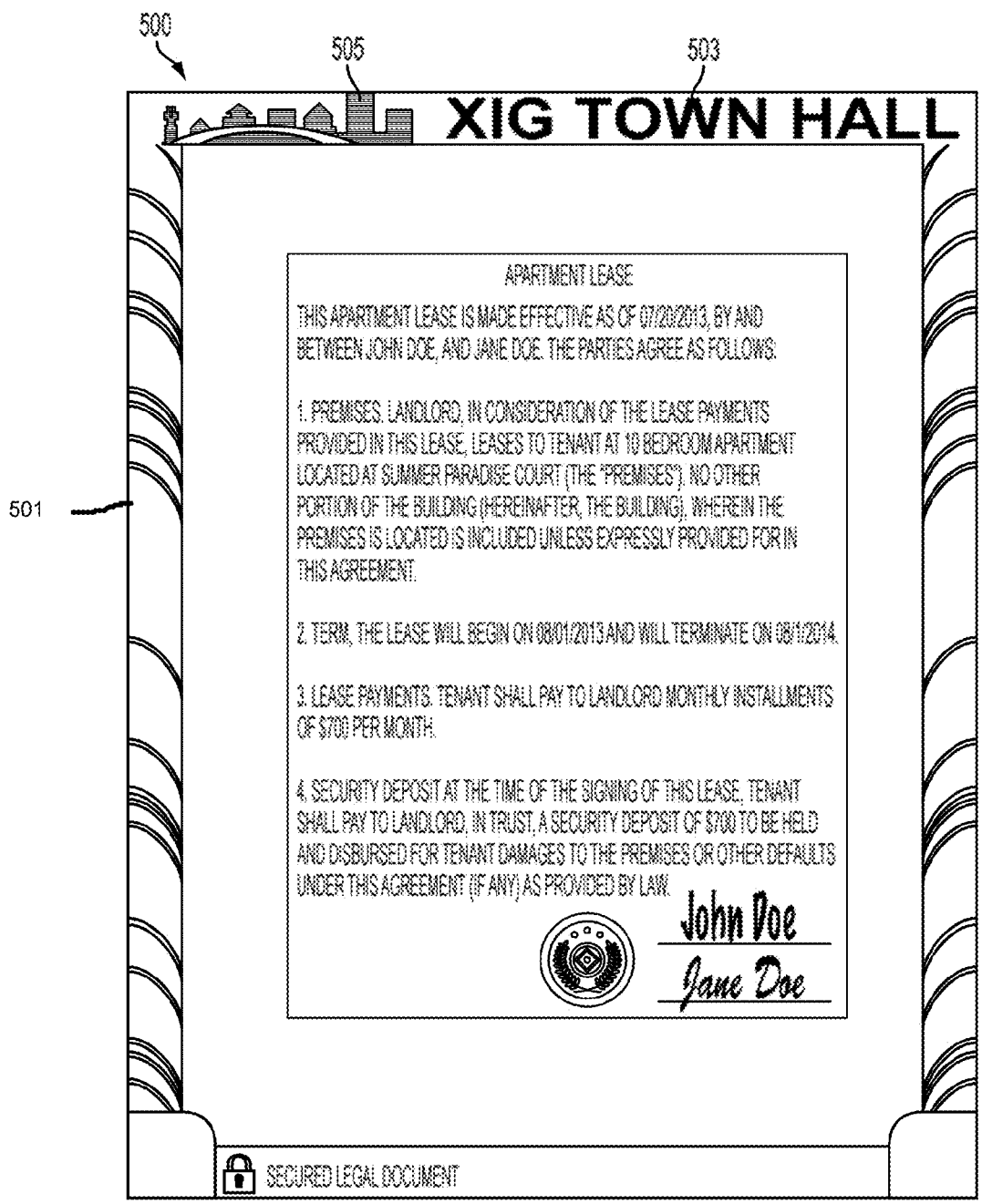
FIG. 5 illustrates an example of a printed, certified document with embedded security elements.

FIG. 5 illustrates an example of a printed, certified document 500 with embedded security elements. Here, the document includes a frame 501 into which security elements are embedded. Although not easily discernible in the reprint of this patent document, the frame 501 may include various security elements such as text or other images containing embedded Correlation Mark text 503, where the text corresponds to metadata from the document file or other data. (Correlation Mark generation is technology that is generally available from Xerox Corporation. Examples of Correlation Mark technology are disclosed in U.S. Pat. No. 7,580,153, the disclosure of which is fully incorporated herein by reference.) Security elements also may contain encoded document data printed with microgloss 505. Some or all of the security elements may not be easily discernible to the human eye, but they may be visible with one or more mechanical or other aids, such as magnification, oblique illumination, exposure to infrared light, or other aids.

Figure 6:
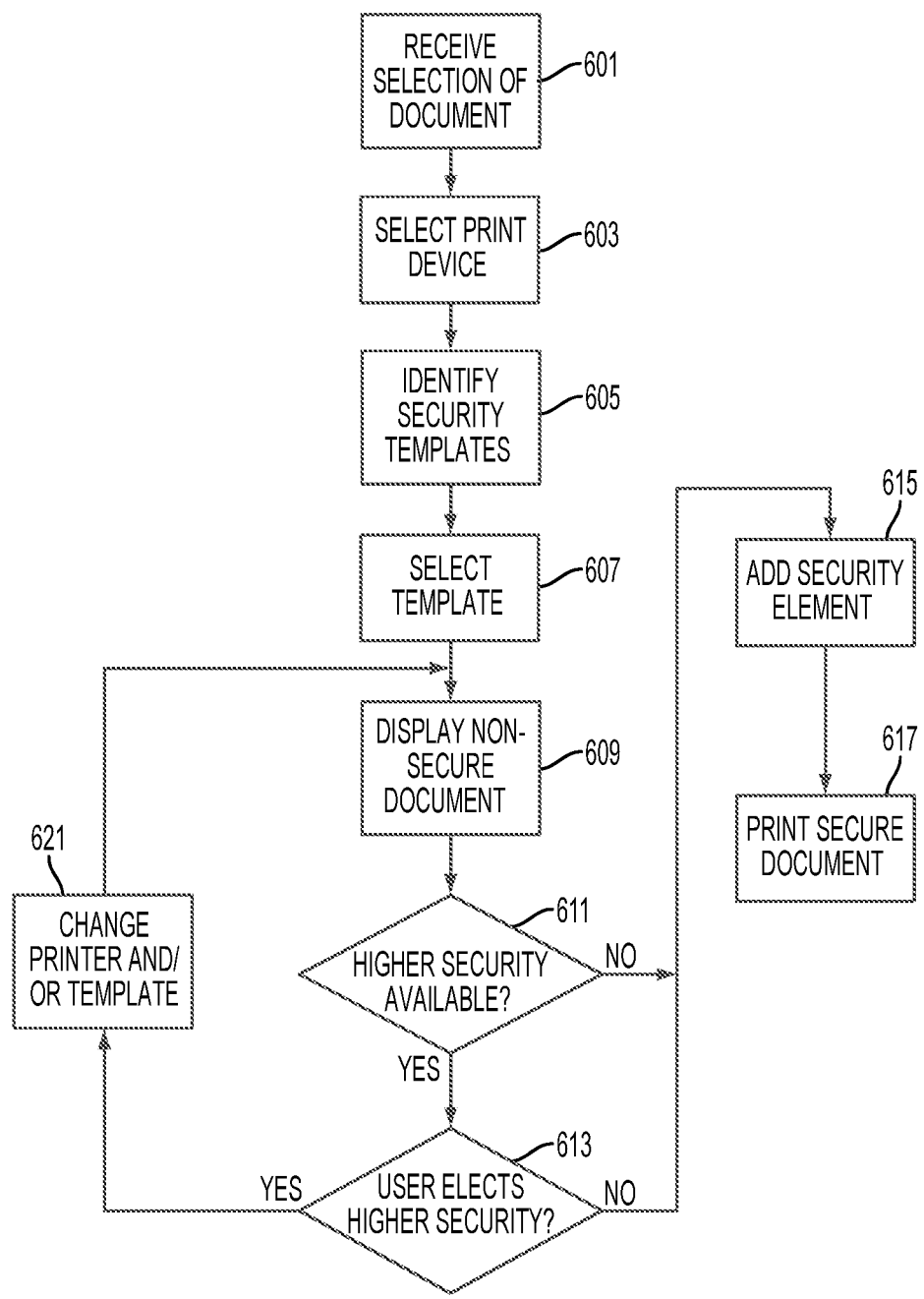
FIG. 6 is a flow diagram illustrating an example of a certified document generation process.

FIG. 6 illustrates an example certified document generation process. The process may begin by receiving user selection of a document to be certified (step 601). As explained above, the selection may be in response to a user interface providing a search function, list or other means by which the user may identify and select documents from a connected document repository. The selection may be received by one or more electronic devices that are in electronic communication with one or more networked print devices, or by a print device itself if it includes document selection functionality. The system may then identify a print device on which the document will be printed (step 603). As also noted above, this may be done automatically based on any suitable criteria, or it may be based on a user's selection of print devices that are available to the user. If only one print device is available, or if a default print device is assigned to or part of the electronic device that receives the user's selection of the document, then this step may simply include the identification of that device, whether as part of the process or in an earlier action, such as during system boot-up.

The system may identify a set of available security templates that correspond to capabilities of the print device and present some or all of the set of available security templates to the user (step 605). In this step, the system may access a data set of available security templates and compare the identifying metadata, rules or other criteria of each candidate template to various capabilities of the selected print device. For example, if the candidate template includes a print resolution criterion, the system may determine whether the print device has a capability of printing with a resolution that satisfies the print resolution criterion, and it will exclude the candidate template from the set of available templates if the resolution capability does not satisfy the print resolution criterion.

When the system receives a selection of one of the available security templates (step 607), it may display, to the user on a display device, the document with a non-secure overlay of the selected security template (step 609) as described above. The non-secure overlay will omit some or all of the security elements that will be included in the printed document. To prepare the document to be printed, the system may add a unique security element to the template without completely displaying the added security element on the display (step 615). As described above, the security information may include identification information about the user, a date and/or time, extracted information from the document itself, or other information. The system may then cause the document to be printed at the selected print device with the selected security template and the added security element (step 617).

As noted above, before printing the document, the system may analyze security template information about the selected template to identify a security level that is associated with the template. It may compare this security information with other security templates that are available for the selected printer, as well as with security templates that can be used with other printers that are available to the user, to determine whether a different security template and/or printer would provide a document with a higher security level (step 611). If so, the system may offer the user an ability to change the selected printer and/or security template to the option that will yield the higher level of security. If the user selects this option (step 613), it may then change the printer and the template to the higher security option before printing (step 621). Otherwise, it may continue to print the original selection.

Figure 7:
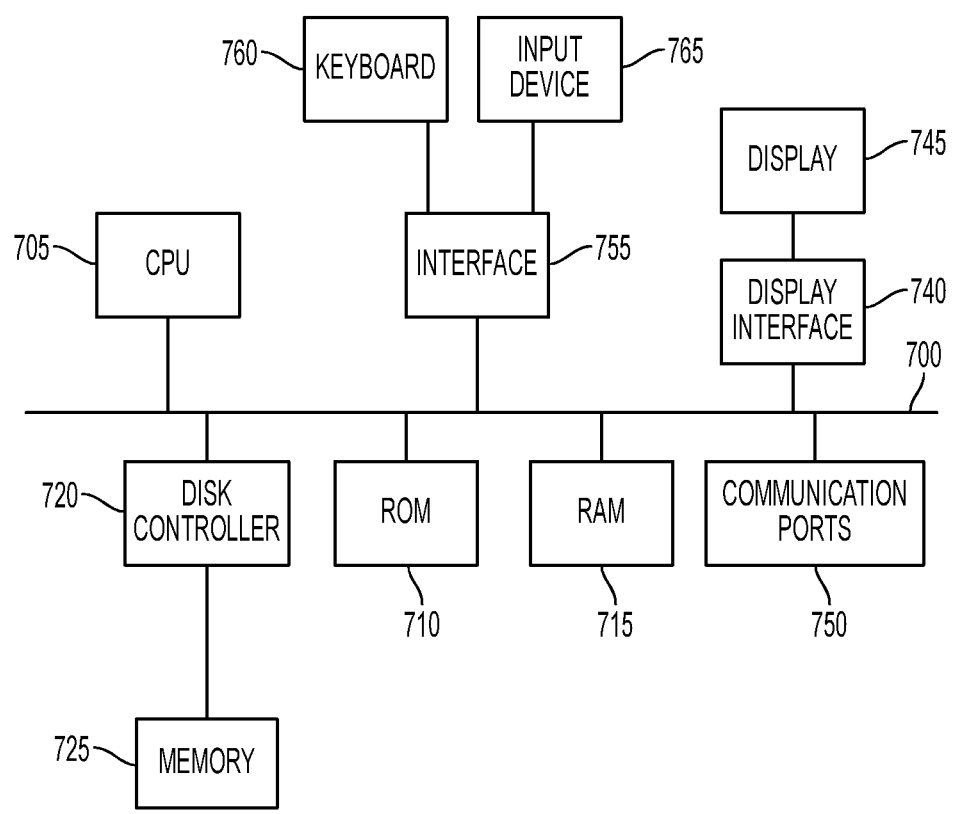
FIG. 7 is a block diagram illustrating various elements of an example of a computing device.

FIG. 7 depicts a block diagram of an example of internal hardware that may be used to contain or implement program instructions, such as the process steps discussed above, according to embodiments. A bus 700 serves as an information highway interconnecting the other illustrated components of the hardware. CPU 705 represents one or more processors of the system, performing calculations and logic operations required to execute a program. CPU 705, alone or in conjunction with one or more of the other elements disclosed in FIG. 7, is an example of a processing device, computing device or processor as such terms are used within this disclosure. Read only memory (ROM) 710 and random access memory (RAM) 715 constitute examples of memory devices or processor-readable storage media.

A controller 720 interfaces with one or more optional tangible, computer-readable memory devices 725 to the system bus 700. These memory devices 725 may include, for example, an external or internal disk drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 710 and/or the RAM 715. Optionally, the program instructions may be stored on a tangible computer readable medium such as a compact disk, a digital disk, flash memory, a memory card, a USB drive, an optical disc storage medium, such as a Blu-ray™ disc, and/or other recording medium.

An optional display interface 740 may permit information from the bus 700 to be displayed on the display 745 in audio, visual, graphic or alphanumeric format. Communication with external devices, such as a printing device, may occur using various communication ports 750. A communication port 750 may be attached to a communications network, such as the Internet or an intranet.

The hardware may also include an interface 755 which allows for receipt of data from input devices such as a keyboard 760 or other input device 765 such as a mouse, a joystick, a touch screen, a remote control, a pointing device, a video input device and/or an audio input device.

The above-disclosed features and functions, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A certified document generation system, comprising:
   one or more processors, a display device, and a non-transitory, computer-readable memory containing programming instructions that, when executed by one or more of the processors, cause one or more of the processors to:
   receive a selection of a document to be certified;
   identify an available print device on which the document will be printed;
   automatically identify a set of available security templates;
   select one of the available security templates;
   add a unique security element to the document according to the template without completely displaying the added security element on the display device as it would appear on the document when printed; and
   before causing the document to be printed, cause the display device to display the document with a non-secure overlay of the selected security template;
   cause the document to be printed at the selected print device with the selected security template and the added security element.

2. The system of claim 1,
   wherein identifying the set of available templates comprises at least one of the following:
   identifying a set of available security templates that correspond to capabilities of the print device; or
   identifying a set of available security templates that corresponds to one or more parameters of the document to be certified.

3. The system of claim 1:
   further comprising programming instructions that, when executed by one or more of the processors, cause one or more of the processors to receive identification information about the user; and
   wherein causing the document to be printed comprises causing the added security element to include the identifying information about a user who selected the document as secure text.

4. The system of claim 1:
   further comprising programming instructions that, when executed by one or more of the processors, cause one or more of the processors to extract information from the document; and
   wherein causing the document to be printed comprises causing the added security element to include the extracted information as secure text.

5. The system of claim 1, wherein the programming instructions that cause adding the unique security element to the document also comprise instructions to add the unique security element to the document without sending the full unique security element to any device that may output the document other than the selected print device.

6. The system of claim 1, further comprising programming instructions that, when executed by one or more of the processors, cause one or more of the processors to, after selecting the security template:
- identify an alternative selection that, if implemented, would yield a printed document with a higher level of security, wherein the alternative selection comprises a different available printer, a different security template, or both;
- offer the alternative selection to a user; and
- if the user accepts the alternative selection, then before causing the document to be printed, change the selected print device, the selected security template, or both to match the alternative selection.

7. The system of claim 2, wherein the programming instructions that cause the one or more processors to identify the set of available security templates that correspond to capabilities of the print device comprise instructions to, for each of a plurality of candidate security templates:
- determine whether the candidate security template includes a print resolution criterion; determining whether the print device has a resolution capability that satisfies the print resolution criterion; and
- exclude the candidate template from the set if the resolution capability does not satisfy the print resolution criterion.

8. The method of claim 1, wherein:
- the set of available security templates consists of one or more templates that are mandated by a certifying entity; and
- selecting the available template is performed automatically, without user selection.

9. A method of securely printing a document, comprising, by a document processing system:
- receiving, from a user, a selection of a document to be certified;
- identifying a print device on which the document will be printed;
- identifying a set of available security templates that correspond to capabilities of the print device;
- presenting the set of available security templates to the user;
- receiving, from the user, a selection of one of the available security templates;
- adding a unique security element to the document according to the template; and
- causing the document to be printed at the selected print device with the selected security template and the added security element.

10. The method of claim 9, further comprising, before causing the document to be printed:
- before causing the document to be printed, displaying, to the user on a display device, the document with a non-secure overlay of the selected security template; and
- when adding the unique security element to the document, doing so without completely displaying the added security element on the display as it would appear on the printed document.

11. The method of claim 9:
- further comprising receiving identification information about a user who selected the document; and
- wherein causing the document to be printed comprises causing the added security element to include the identifying information about the user as secure text.

12. The method of claim 9:
- further comprising extracting information from the document; and
- wherein causing the document to be printed comprises causing the added security element to include the extracted information as secure text.

13. The method of claim 9, wherein adding the unique security element to the document also comprises adding the unique security element to the document without sending the full unique security element to any device that may output the document other than the selected print device.

14. The method of claim 9, further comprising, after receiving the user selection of one of the security templates:
- identifying an alternative selection that, if implemented, would yield a printed document with a higher level of security, wherein the alternative selection comprises a different available printer, a different security template, or both;
- offering the alternative selection to a user; and
- if the user accepts the alternative selection, then before printing the document, changing the selected print device, the selected security template, or both to match the alternative selection.

15. The method of claim 9, wherein identifying the set of available security templates that correspond to capabilities of the print device comprises, for each of a plurality of candidate security templates:
- determining whether the candidate security template includes a print resolution criterion;
- determining whether the print device has a resolution capability that satisfies the print resolution criterion; and
- excluding the candidate security template from the set if the resolution capability does not satisfy the print resolution criterion.

16. A certified document generation system, comprising:
- a print device;
- one or more processors;
- a display device;
- a non-transitory, computer-readable memory containing a data set representing a plurality of available security templates; and
- a non-transitory, computer-readable memory containing programming instructions that, when executed by one or more of the processors, cause one or more of the processors to:
  - receive a selection of a document to be certified;
  - select, from the data set, a security template that corresponds to one or more parameters of the document;
  - add a unique security element to document in accordance with the template and display the document on the display without completely displaying the added security element on the display device as it would appear on the document when printed; and
  - cause the document to be printed at the print device with the added security element.

17. The system of claim 16, further comprising instructions that, when executed by the processor, cause the display device to display the document with a non-secure overlay of the identified security template for the document.

18. The system of claim 16:
- further comprising programming instructions that, when executed by one or more of the processors, cause one or more of the processors to receive identification information about a user who selected the document; and
- wherein causing the document to be printed comprises causing the added security element to include the identifying information about the user as secure text.

19. The system of claim 16:
further comprising programming instructions that, when executed by one or more of the processors, cause one or more of the processors to extract information from the document; and
wherein causing the document to be printed comprises causing the added security element to include the extracted information as secure text.

20. The system of claim 16, wherein the programming instructions that cause adding the unique security element to the document also comprise instructions to add the unique security element to the document without sending the full unique security element to any device that may output the document other than the print device.

21. The system of claim 16, further comprising programming instructions that, when executed by one or more of the processors, cause one or more of the processors to, after identifying the security template for application to the document:
identify an alternative template that, if applied to the document, would yield a printed document with a higher level of security, wherein the alternative selection comprises a different available printer, a different security template, or both;
offer the alternative selection to a user; and
if the user accepts the alternative selection, then before causing the document to be printed, change the print device, the selected security template or both to match the alternative selection.

22. The system of claim 16, wherein:
the set of available security templates consists of one or more templates that are mandated by a certifying entity.

23. A non-transitory computer-readable medium containing programming instructions that, when executed by one or more processors, cause the one or more processors to generate and print a certified document by a process comprising:
receive, from a user, a selection of a document to be certified;
identifying a print device on which the document will be printed;
identifying one or more security templates that correspond to one or more parameters of the document, the print device, or both;
selecting one of the security templates as a template for application to the document;
causing a display device to display the document with a non-secure overlay of the identified security template for the document;
adding a unique security element to document in accordance with the template without completely displaying the added security element on the display device; and
causing the document to be printed at the print device with the selected security template and the added security element.

24. The computer-readable medium of claim 23 further comprising additional programming instructions to:
cause one or more of the processors to receive identification information about the user;
wherein causing the document to be printed comprises causing the added security element to include the identifying information about the user as secure text.

25. The computer-readable medium of claim 23 further comprising additional programming instructions to:
cause one or more of the processors to extract information from the document;
wherein causing the document to be printed comprises causing the added security element to include the extracted information as secure text.

26. The computer-readable medium of claim 23, wherein the programming instructions that cause adding the unique security element to the document also comprise instructions to add the unique security element to the document without sending the full unique security element to any device that may output the document other than the print device.

27. The computer-readable medium of claim 23, further comprising programming instructions that, when executed by one or more of the processors, cause one or more of the processors to, after identifying the security template for application to the document:
identify an alternative template that, if applied to the document, would yield a printed document with a higher level of security, wherein the alternative selection comprises a different available printer, a different security template, or both;
offer the alternative selection to a user; and
if the user accepts the alternative selection, then before causing the document to be printed, change the print device, the selected security template or both to match the alternative selection.

28. The computer-readable medium of claim 23, wherein the programming instructions to identify the subset of security templates comprise instructions to, for each of a plurality of candidate security templates:
determine whether the candidate security template includes a print resolution criterion;
determine whether the print device is capable of satisfying the print resolution criterion; and
exclude the candidate security template from the subset if the print device does not satisfy the print resolution criterion.

29. A certified document generation system, comprising:
one or more processors, a display device, and a non-transitory, computer-readable memory containing programming instructions that, when executed by one or more of the processors, cause one or more of the processors to:
receive a selection of a document to be certified;
identify an available print device on which the document will be printed;
identify a set of available security templates;
select one of the available security templates;
identify an alternative selection that, if implemented, would yield a printed document with a higher level of security, wherein the alternative selection comprises a different available printer, a different security template, or both;
offer the alternative selection to a user; and
if the user accepts the alternative selection, then before causing the document to be printed, change the selected print device, the selected security template, or both to match the alternative selection.
add a unique security element to the document according to the template without completely displaying the added security element on the display device as it would appear on the document when printed; and
cause the document to be printed at the selected print device with the selected security template and the added security element.

* * * * *